3,121,443
SPEED CONTROL VALVE
William Carls, Highland, Mich.
Filed Aug. 25, 1961, Ser. No. 133,853
4 Claims. (Cl. 137—269)

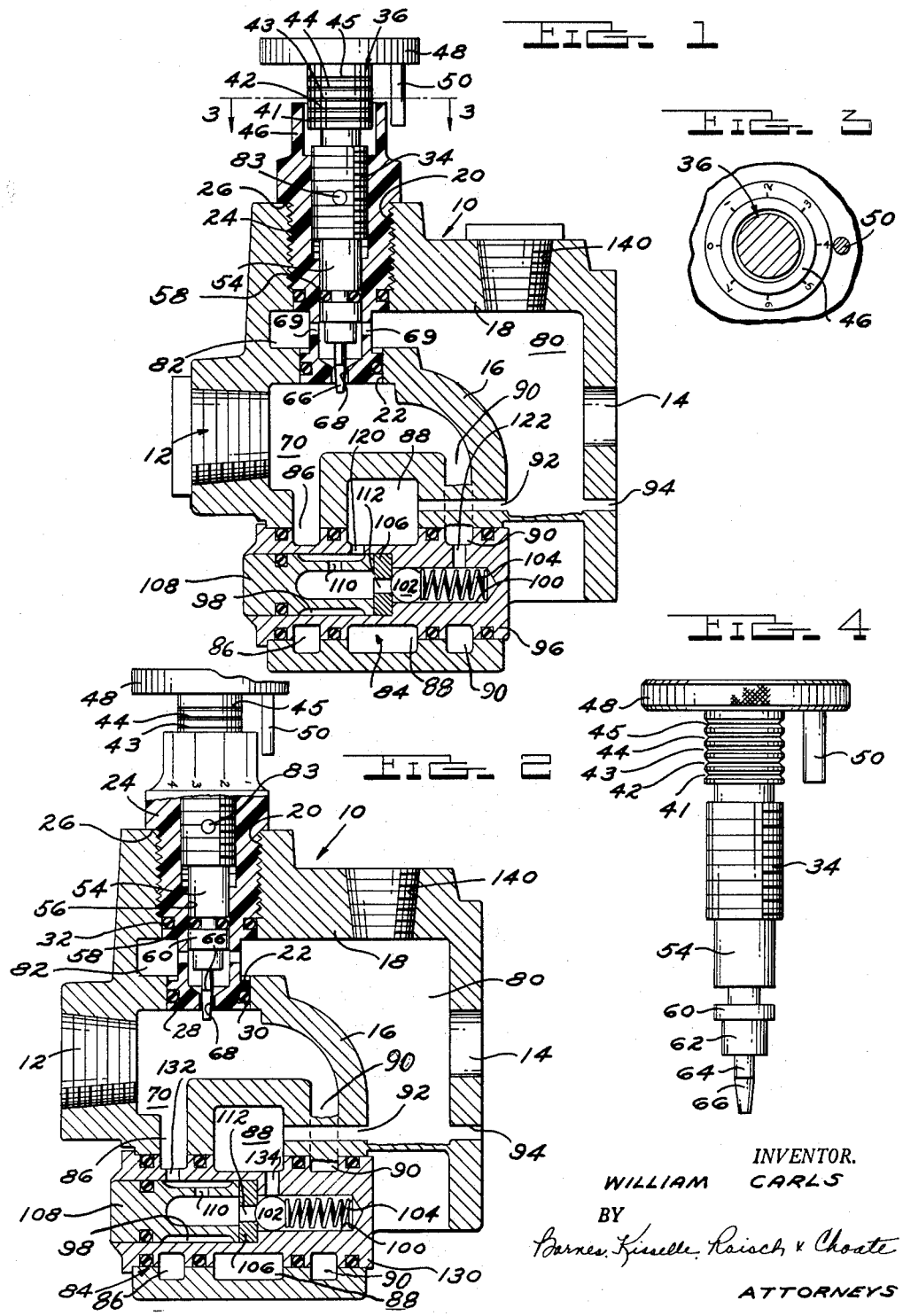

This invention relates to a speed control valve and more particularly to a valve which can be controlled and to a single valve housing which can be used either as a metering-in or a metering-out valve.

It is an object of the invention to provide an improved time delay valve which is accurately controlled by an external manually adjustable part which can be readily adjusted visually to an accurate position.

It is a further object of the invention to provide a device which controls the flow of air in a predetermined direction and which is consecutively operable without danger of freezing or blocking.

It is a further object to provide a valve construction which may be reversed in its operation, that is, used for a metering-in operation as distinguished from a metering-out operation by a simple cartridge change at one portion of the valve, leaving all other parts the same. This increases the versatility of the valve and reduces the expense of manufacture. The arrangement of valve ports and passages permits this simple change while still maintaining a free-way in one direction and a controlled path in the other direction.

Other objects and features of the invention relating to details of construction and operation will be apparent in the following description and claims.

Drawings accompany the disclosure and the various views thereof may be briefly described as:

FIGURE 1, a sectional view of the device showing the relationship of the various parts with a metering-in cartridge installed.

FIGURE 2, a sectional view of the device illustrating the adjustment means and containing a metering-out cartridge.

FIGURE 3, a sectional view on line 3—3 of FIGURE 1.

FIGURE 4, an elevation of the control screw.

Referring to the drawings:

The sectional housing shown in FIGURES 1 and 2 is adapted to be used either as a metering-in or metering-out valve. This adaptation can be made by change of a control cartridge in the housing.

In FIGURE 1 the sectional view of the valve shows a main housing 10 which has an inlet port 12 and an outlet port 14. These ports are separated by a septum 16 which at one point parallels the top wall 18 which has a tapped opening 20 concentrically aligned with an opening 22 in the septum 16. The structure in FIGURE 2 in this respect is the same. In the hole 20 is a threaded nipple 24 having a shoulder 26 which seats against the top of the valve housing. The lower end of the nipple 24 has a portion 28 which positions in the opening 22 of septum 16 with a suitable O-ring seal 30. A similar O-ring 32 seals the nipple in the wall 18.

The nipple 24 has a central opening which is stepped to receive a threaded shaft 34. The outer end of the shaft 34 carries a cylindrical portion 36 which is provided with equally spaced annular grooves 41, 42, 43, 44 and 45. These grooves are to be visually related to the collar 46 surrounding the portion 36 so that the axial position of the threaded shaft in the opening can be gauged. On the knurled head 48 there is an off-center pin 50 which can relate to axial graduation lines circumferentially spaced around the collar 46. The lines are related so that there are eight spaces which are equivalent in the turning of the thread to the distance between grooves 45 and 44, for example. Thus, the shaft 34 can be accurately positioned relative to collar 46.

At the other end of the threaded shaft 34 is found a cylindrical portion 54 which has a loose slip fit in a bore 56 in the nipple 24. Below this portion 54 is an O-ring 58 and a further guide portion 60 which narrows to a portion 62 and narrows again to a needle portion 64. The needle portion 64 has a slight tapered end 66 which cooperates with a seat opening 68 in the end of the nipple 24. The wall of the nipple 24 is apertured at 69 around the shaft portion 62 above the needle to permit the passage of air through the nipple wall.

It will be seen that the projection of the portion 66 into the opening 68 reduces the flow through this opening. The parts are preferably arranged such that there is never any complete blocking of the opening. This prevents any jamming of the parts which might influence the adjustment. Thus, the needle 66 controls the passage between a port chamber 70 inside port 12 and a leg 82 of U-shaped chamber 80 inside port 14. A suitable plastic plug 83 can be used to stabilize the motion of the threaded adjustment screw 34 against accidental turning by vibration.

Below the chambers 70 and 80 is a dependent portion of the valve which contains a bore generally indicated at 84 and there are three cored portions 86, 88 and 90 along this bore. The cored portion 88 is connected to the chamber 80 through a passage 92 which is drilled in from the right-hand wall of the housing through an aligned passage 94. These various cored portions are connected selectively and alternatively by varying cartridges.

In the metering-in valves in FIGURES 1 the cartridge 96 has four external lands, each provided with an O-ring groove for a seal to relate to the walls of the bore 84. The cartridge has a central bore with an enlarged portion 98 and a smaller concentric portion 100. The small portion contains a ball 102 urged to the left by a spring 104 against a seat 106 positioned at a shoulder at the right-hand end of the enlarged portion. Behind the seat 106 is a closed-end hollow plug 108 which holds the seat in place, this plug having an annular groove on the outer surface and the walls being apertured at 110 to connect the outside of the plug to an opening 112 in the seat. The plug can be staked or spun into place in the cartridge 96. The cartridge 96 in FIGURE 1 has an opening 120 leading from cored passage 88 to the external portion of plug 108 through the passage 110 to the seat opening 112 and the ball 102. The cartridge 96 also has a wall opening 122 which leads to the chamber 70 through the cored passage 90.

Thus, it will be seen that air entering the port 12 must pass through the restricted path around the needle valve 66 to the chamber 80 and the outlet 14. On return, the bulk of the air entering the port 14 and chamber 80 can pass, because of low resistance, through the passage 92 to the cored passage 88 through port 120, 110 and 112 to ball 102 which, moved from its seat, permits air to escape to chamber 70 through port 122. Thus, a quick return can be accomplished through this recited path.

The metering-out valve shown in FIGURE 2 has all parts identical with that shown in FIGURE 1 with the exception of the cartridge 130. This cartridge is very much the same as cartridge 96 in FIGURE 1 except that it contains a port 132 leading to the cored passage 86 and to the exterior of the plug 108. It also has a wall passage 134 leading from the ball 102 to the cored passage 88. It will be noted that passage 90 is blocked at the cartridge 130. Thus, it will be seen that air entering the port 12 of the valve in FIGURE 2 can pass, for the most part, through ports 132, 110 and 112 to ball 102, which when displaced against spring 104, allows air to continue through port 134, passage 88 and passage 92 to chamber 80 and port 14. On the return flow, however, air is blocked at the ball 102 so that it must pass only around the needle 66 to the port 12.

Thus, with a slight change in the cartridge 96 as compared with the cartridge 130 the valve can be easily switched from a metering-in valve to a metering-out valve and vice versa. The cartridges can be distinctly marked by indicia or color to readily indicate which type of valve is in position. The adjustment mechanism can remain exactly the same and the metering valve is so arranged that it can be used to control accurately the flow in either direction.

In the housing 10 a supplemental port 140 is normally plugged. This can be used for adding a volume chamber if it is desired that the chamber 80 have a greater volume. In some installations this proves advantageous.

Viewed generally, the passage 80 is U-shaped having two legs, one passing the valve end of nipple 24 and the other 92 moving into port 88. Port 70 is U-shaped around port 88, one leg 86 lying on one side, and one leg 90 lying on the other side. Cartridges 96 and 130 connect the leg 92 to the seat side and the spring side of the ball 102 respectively, and at the same time connect port 70 to the spring side and the seat side of the ball 102, respectively. Leg 90 is offset from leg 92 while the needle valve in leg 92 controls the flow in one direction in each case.

I claim:

1. A speed control valve for fluid control which comprises a valve housing having spaced connection ports each to serve selectively as inlet and outlet ports, means to form within said housing first and second U-shaped passages connected to each of said ports, an elongated bore in said housing adjacent to and communicating with the legs of said first U-shaped passage and a first leg of the said second U-shaped passage, an adjustable restriction valve connecting the second leg of said second U-shaped passage with said first U-shaped passage, and a pair of cartridges each selectively insertable into said elongated bore, each cartridge having a unidirectional check valve mounted therein, said cartridges respectively having passages to connect said unidirectional valve to said first leg of said second U-shaped passage and to a leg of the first U-shaped passage for passage in one direction from said first leg, and to connect said unidirectional valve to the other leg of said first U-shaped passage and to said first leg of said second U-shaped passage for passage to said first leg in a reverse direction.

2. A control valve as defined in claim 1 in which each of said cartridges is formed as a hollow cylinder with four lands to lie in sealed relation to the walls of said elongated bore, a stepped bore within said cylinder having a shoulder at one end of the larger bore leading to the smaller bore, a valve seat against said shoulder, a ball in the smaller bore biased against said seat, and means in the larger bore for holding said seat in position comprising a hollow plug closed at its outer end and serving to close the end of said stepped bore.

3. A speed control valve as defined in claim 1 in which the adjustable restriction valve comprises a seat interposed between said second leg of said second U-shaped passage and said first U-shaped passage, a relatively long taper needle valve relatively adjustable relative to said seat, and means to adjust said valve comprising a screw in said valve housing, having a portion projecting from said housing, spaced alternate annular rings and grooves on said projecting portion to indicate the relative axial position of said screw to said housing, a head on said screw, and means on said head axially overlying a circumferentially graduated portion of said housing to indicate the relative circumferential position of rotation of said screw in said housing between the axial indicator grooves.

4. A speed control valve as defined in claim 1 in which the adjustable restriction valve comprises a nipple insertable into said housing having a portion insertable into a wall between said U-shaped passages and a seat formed in said nipple between said passages, said nipple being hollow and having a threaded internal passage, a threaded valve stem having a relatively long taper needle valve at one end to coact with said seat and a control stem and head at the other end, said stem having a plurality of axially spaced alternate rings and grooves to indicate the relative axial position of said stem to said nipple, said nipple having a circumferentially graduated wall adjacent its outer end, and an inward projection on said head overlying said graduation to indicate the relative position of rotation of said head to said nipple between the axial indicator grooves, said valve stem having a threaded relation to said housing wherein one revolution of said valve moves the valve axially the distance between adjacent indicator grooves.

References Cited in the file of this patent

UNITED STATES PATENTS

| | | |
|---|---|---|
| 2,335,923 | Dube | Dec. 7, 1943 |
| 2,495,785 | Stephens | Jan. 31, 1950 |
| 2,514,025 | Bush | July 4, 1950 |
| 2,606,571 | Ernst | Aug. 12, 1952 |
| 2,656,846 | Anderson | Oct. 27, 1953 |
| 2,922,432 | Huntington | Jan. 26, 1960 |
| 2,940,465 | Frantz | June 14, 1960 |
| 2,989,075 | Johnston | June 20, 1961 |